United States Patent [19]

McShane, Jr. et al.

[11] Patent Number: 4,503,192

[45] Date of Patent: Mar. 5, 1985

[54] CURED ELASTOMERS WITH IMPROVED HIGH TEMPERATURE TEAR STRENGTH

[75] Inventors: Herbert F. McShane, Jr.; Peter N. Plimmer, both of Wilmington; Charles W. Stewart, Newark, all of Del.

[73] Assignee: E. I. Du Pont de Nemours and Company, Wilmington, Del.

[21] Appl. No.: 568,888

[22] Filed: Jan. 6, 1984

[51] Int. Cl.$^3$ .................. C08L 23/26; C08L 23/28
[52] U.S. Cl. ............................ 525/192; 525/194; 525/196; 525/240; 525/193
[58] Field of Search ............... 525/192, 240, 196

[56] References Cited

U.S. PATENT DOCUMENTS 3,641,216  2/1972  Schnebelen et al. .............. 525/192
4,141,878  2/1979  Coran et al. .................... 525/240

Primary Examiner—Carman J. Seccuro

[57] ABSTRACT

Blends of elastomers of chlorinated or chlorosulfonated polyethylene and ultra high molecular weight, i.e. at least one million, when cured with conventional curing systems for the chlorinated or chlorosulfonated polyethylene have higher tear strengths at temperatures of about 150° C. than do the unblended elastomers. The amount of polyethylene in the blend is 5 to 50 parts by weight per 100 parts by weight of elastomer. The blend, thus produced has a modulus ($M_{100}$) of greater than 1000 psi prior to curing.

4 Claims, No Drawings

CURED ELASTOMERS WITH IMPROVED HIGH TEMPERATURE TEAR STRENGTH

SUMMARY

This invention relates to a blend of (1) an elastomeric chlorinated polyethylene or a chlorosulfonated polyethylene and (2) an ultra high molecular weight linear polyethylene. These blends when cured with conventional curing systems for chlorinated polyethylene or chlorosulfonated polyethylene have higher high temperature tear strength than do the cured chlorinated polyethylene or the cured chlorosulfonated polyethylene. The ultra high molecular weight linear polyethylene must be of at least one million in molecular weight. The blends contain between 5 and 50 parts by weight of the ultra high molecular weight polyethylene per 100 parts by weight of the elastomeric chlorinated or chlorosulfonated polyethylene and the blends have a 100% modulus of at least 1000 psi. The high temperature tear strength of the cured blend is an advantage over the cured elastomer not containing the ultra high molecular weight polyethylene in that the cured blend may be removed from a mold without the need of waiting for the molded article to cool to increase its tear strength— thus reducing the mold cycle time, and the molded article can be used in high temperature environments (150° C.) with decreased risk of the molded article tearing.

BACKGROUND

Chlorinated polyethylene and chlorosulfonated polyethylene are commercial elastomeric materials. A process for the manufacture of chlorosulfonated polyethylene is disclosed in the McAlevy et al. U.S. Pat. No. 2,416,061. A process for the production of chlorinated polyethylene is disclosed for example in Schnebelen et al. U.S. Pat. No. 3,641,216. Blends of chlorosulfonated polyethylene and polyethylene are disclosed for example in Luh U.S. Pat. No. 3,816,347 and Coran U.S. Pat. No. 4,141,878, however in both of these patents the polyethylene is not of the molecular weight that has been found necessary to achieve the desirable properties hereinbefore described. Schumacher et al. U.S. Pat. No. 3,641,216 discloses blends of chlorinated polyethylene and linear polyethylene. This patent requires that the blend have a modulus of less than 500 psi, (3.45 MPa).

DETAILED DESCRIPTION

The chlorosulfonated polyethylenes useful in the present invention may be manufactured from either linear (high density) polyethylene, or branched (low density) polyethylene by dissolving the polyethylene in a solvent and then reacting the polyethylene with chlorine and sulfur dioxide in the presence of a free radical catalyst such as 2,2'azobisisobutyronitrile. Typically commercial chlorosulfonated polyethylene contains about 25 to 45 percent by weight chlorine and 1 to 2% by weight sulfur.

The ultra high molecular weight polyethylene useful in the present invention is a commercial item of commerce. It is a linear polyethylene; it has a molecular weight as determined by intrinsic viscosity or light scattering of at least 1 million, and may be as high as 6 million. In the trade such polymers of ethylene are sometimes referred to as UHMW PE. Because of their extremely high molecular weight a usual method of characterizing them—in terms of Melt Index—is inapplicable for the polymers will not flow under the standard conditions. Such polymers are sold by Hercules Inc. as "HiFax 1900". Typically such polymers have densities of about 0.94 gm/cc and molecular weights of $5 \times 10^6$.

Elastomeric chlorinated polyethylene useful in this invention typically contain 20 to 50% by weight chlorine, and are made by dissolving the polymer in solvent and reacting with chlorine in the presence of a peroxide catalyst.

There are three typical curing systems for chlorosulfonated polyethylene, namely the litharge (i.e. lead oxide) system, the litharge/magnesia (i.e. lead oxide/magnesium oxide) system, and the magnesia/pentaerythritol system. All three systems are more fully described in *Vulcanization of Elastomers* Edited by G. Alleger and I. J. Sjothun, Reinhold Pub. Corp., N.Y. 1964 at pages 275–279.

The blends of the present invention when cured with the typical curing systems of the art produce molded articles that have higher tear strength at high temperatures than do molded articles made from the elastomer that do not contain the ultra high molecular weight polyethylene. Thus the present invention is a process for increasing the tear strength at high temperature, as well as a composition, i.e. a blend, that may be cured to obtain articles having the higher tear strength at high temperatures.

It should be noted that the process and blend of the present invention are primarily of interest to the manufacturer of molded parts, and especially the manufacturer of molded parts of complex shapes that require some stretching of the molded part to remove the part from the mold. The tear strength of molded articles of chlorosulfonated polyethylene of the prior art is quite low at or near the typical molding temperature, and when parts that required elongation to remove them from the mold were manufactured it was (prior to the present invention) often necessary to cool the part substantially before attempting to remove it from the mold. Using the process and blend of the present invention it is possible to remove the molded article from the mold without cooling the mold as much. Thus mold cycle time is reduced, and more molded articles can be produced in a given period of time using the process and blend of the invention.

Secondarily the process and blend of this invention are of interest to parts fabricators that desire parts that can be used in applications where a somewhat higher temperature is encountered than typical for molded parts of chlorosulfonated or chlorinated polyethylene. Thus the use of the process and blend of the present invention will increase the utility temperature range for chlorosulfonated and chlorinated polyethylene.

In the following examples, which illustrate the invention, all parts and percents are by weight unless otherwise indicated.

EXAMPLE I

A series of chlorosulfonated polyethylene compounds were prepared using the following formulations:
 100 parts by weight chlorosulfonated polyethylene containing 36% chlorine and 1.0% sulfur, and further characterized by Mooney Viscosity of 95 and a specific gravity of 1.18.

40 parts by weight of semireinforcing furnace carbon black, known in the trade as (SRF);
10 parts by weight of magnesium oxide;
20 parts by weight of white lead oxide;
3 parts by weight of nickel dibutyl dithiocarbonate;
2 parts by weight of dipentamethylenethiuram tetrasulfide;
0.5 parts by weight of mercaptobenzothiozole;
20 parts by weight of the various polyethylenes shown below:
 LLD=Schlair ® 11R Linear Low Density Polyethylene (Du Pont), specific gravity: 0.92 and Melt Index 1.6 g/10 min.
 LD=Alathon ® 20 Low Density Polyethylene (Du Pont) specific gravity: 0.92 and Melt Index 1.9 g/10 min.
 HD=Alathon ® 7040 High Density Polyethylene (Du Pont) specific gravity: 0.96 and Melt Index 6.0 g/10 min.
 HiFax ® 1900 Ultrahigh Molecular Weight Polyethylene (Hercules) (Mol. wt.=$5 \times 10^6$, Intrinsic Viscosity 25 in trichlorobenzene, density 0.94 gm/cc).

The compounds were mill mixed on a cold mill (<50° C.), sheeted out, pressed into 0.2 cm thick slabs and cured at 153° C. for 30 min. The polyethylenes were well dispersed in the samples. After curing above their melting temperatures (138° C.), test pieces were cut from the slabs and were subjected to tensile tests (ASTM D-412) and tear tests (ASTM D-470) at 25° C. and at 150° C. The results are shown in Table I.

TABLE I

| Polyethylene | Control None | Comparative Examples | | | Ex. 1 the Invention HiFax ® 1900 |
|---|---|---|---|---|---|
| | | LLD | LD | HD | |
| 25° C. $M_{100}$ (MPa) | 13 | 11 | 11 | 12 | 16 |
| $T_B$ (MPa) | 22 | 19 | 15 | 12 | 25 |
| $E_B$ (%) | 160 | 190 | 150 | 100 | 165 |
| Tear (kN/m) | 4 | 15 | 16 | 16 | 17 |
| 150° C. $T_B$ (MPa) | 5.2 | 1.7 | 1. | 1.5 | 4.5 |
| $E_B$ (%) | 60 | 60 | 30 | 30 | 60 |
| Tear (kN/m) | .5 | .3 | .1 | .3 | 1.7 |

$T_B$ = tensile strength at break (ASTM D-412)
$E_B$ = elongation at break (ASTM D-412)
$M_{100}$ = modulus at 100% elongation
Tear = tear strength (ASTM D-470)

Table I shows that all the polyethylenes except HiFax ® 1900 grossly reduced the 150° C. Tensile strength of the sample. Table I further shows that only the sample containing HiFax ® 1900 increased the Tear strength at 150° C.

EXAMPLE II

Example I was repeated, except that this time the ingredients were mixed on a cold mill and then the temperature of the mill was raised to 150° C. before the compounds were sheeted out. The stocks were pressed into slabs and cured at 153° C. for 30 min. Test pieces were cut from the slabs and were subjected to Tensile and Tear Tests at 25° C. and 150° C. The results are shown in Table II.

TABLE II

| Polyethylene | Control None | Comparative Examples | | | Ex. 2 the Invention HiFax ® 1900 |
|---|---|---|---|---|---|
| | | LLD | LD | HD | |
| 25° C. $M_{100}$ (MPa) | 13 | 9 | 9 | 13 | 14 |
| $T_B$ (MPa) | 22 | 24 | 23 | 26 | 27 |
| $E_B$ (%) | 160 | 290 | 260 | 250 | 210 |
| Tear (kN/m) | 4 | 6 | 6 | 7 | 8 |
| 150° C. $T_B$ (MPa) | 5.2 | 5.2 | 4.8 | 4.0 | 5.9 |
| $E_B$ (%) | 60 | 110 | 100 | 90 | 100 |
| Tear (kN/m) | .5 | .3 | .5 | .5 | 2.0 |

Table II shows that only HiFax ® 1900 causes an increase in Tear strength at 150° C.

EXAMPLE III

A series of compounds were prepared as in Example II except that the quantity of UHMW PE (HiFax ® 1900) used was 5 parts, 10 parts and 15 parts per 100 parts chlorosulfonated polyethylene. The compounds were sheeted out, pressed and cured at 153° C. for 30 min. Test pieces were cut from the slabs and were subjected to tensile and tear tests. The results are shown in Table III.

TABLE III

Tensile and Tear Tests of chlorosulfonated polyethylene containing 5 phr, 10 phr, and 15 phr UHMW PE (HiFax ® 1900)

| UHMW PE (phr) | 5 | 10 | 15 |
|---|---|---|---|
| 25° C. $M_{100}$ (MPa) | 14 | 15 | 16 |
| $T_B$ (MPa) | 25 | 27 | 28 |
| $E_B$ (%) | 160 | 170 | 190 |
| Tear (kN/m) | 4.5 | 5.0 | 6 |
| 150° C. $T_B$ (MPa) | 6.2 | 6.2 | 6.2 |
| $E_B$ (%) | 70 | 90 | 90 |
| Tear (kN/m) | 0.7 | 1.6 | 1.5 |

When these results are compared with those in Table II, it is seen that for a significant improvement in high temperature tear strength, the level of UHMW PE should be greater than 5 phr.

EXAMPLE IV

Chlorinated Polyethylene

A series of chlorinated polyethylene compounds were prepared using the following formulations: 100 parts by weight chlorinated polyethylene containing 35% chlorine, 54 parts by weight SRF carbon black, 5 parts by weight magnesium oxide, 3 parts by weight paraffin wax, 4 parts by weight triallyl cyanurate, 6 parts by weight 2,5-dimethyl-2,5-di(t-butyl-peroxy)hexane (Varox ® R. T. Vanderbilt), 20 parts by weight of the various polyethylenes used in Example I.

The compounds were mill mixed on a hot mill (150° C.) to melt the polyethylenes. They were sheeted out, pressed into slabs and cured for 30 minutes at 160° C. Test pieces were cut from the slabs and were subjected to tensile tests and tear tests at 25° C. and 150° C. The results are shown in Table IV.

TABLE IV

Tensile and Tear Tests of Chlorinated Polyethylene Containing 20 phr UHMW PE and Conventional Polyethylene

| Polyethylene | Control None | Comparative Examples | | | Ex. IV the Invention HiFax ® 1900 |
|---|---|---|---|---|---|
| | | LLD | LD | HD | |
| 25° C. $M_{100}$ (MPa) | 14 | 8 | 8 | 9 | 8 |
| $T_B$ (MPa) | 22 | 16 | 17 | 17 | 12 |
| $E_B$ (%) | 150 | 300 | 280 | 250 | 270 |
| Tear (kN/m) | 4 | 18 | 18 | 8 | 12 |
| 150° C. $M_{100}$ (MPa) | — | 2.7 | 2.6 | 3.1 | 1.8 |
| $T_B$ (MPa) | 5.1 | 3.1 | 4.2 | 3.1 | 2.5 |
| $E_B$ (%) | 70 | 130 | 160 | 100 | 130 |
| Tear (kN/m) | 0.6 | 0.5 | 0.4 | 0.6 | 1.1 |

Table IV shows that only the sample containing Hi-Fax ® 1900 increased the tear strength at 150° C.

The chlorinated polyethylene used was low density, containing 35% by weight chlorine and a specific gravity of 1.16.

We claim:

1. A thermoset cured blend of (a) an elastomeric material selected from the class consisting of chlorinated polyethylene, and chlorosulfonated polyethylene and (b) polyethylene, and (c) a conventional curing system for elastomeric chlorinated polyethylene or elastomeric chlorosulfonated polyethylene said blend when cured having a tear strength at 150° C. greater than the tear strength of the unblended cured chlorinated polyethylene or chlorosulfonated polyethylene, said blend containing between 5 and 50 parts by weight of polyethylene per 100 parts by weight of chlorinated polyethylene or chlorosulfonated polyethylene, said polyethylene being a linear polymer of ethylene, having a molecular weight of at least one million, said blend having a room temperature 100 percent modulus of greater than 1000 psi (6.9 MPa).

2. The blend of claim 1 in which the elastomeric material is chlorosulfonated polyethylene.

3. A process for improving the high temperature tear strength of a cured elastomeric material selected from the class consisting of chlorinated polyethylene and chlorosulfonated polyethylene, which comprises blending between 5 to 50 parts by weight of linear polyethylene per 100 parts by weight of the elastomeric material, said polyethylene having a molecular weight of at least one million thus forming a blend having room temperature 100% modulus of at least 1000 psi (6.9 MPa), and then curing said blend with a conventional curing system for the elastomeric material.

4. The process of claim 3 in which the elastomeric material is chlorosulfonated polyethylene.

* * * * *